United States Patent

[11] 3,580,417

[72] Inventor Peter Alfred Hobbs
 St. Albans, England
[21] Appl. No 741,759
[22] Filed July 1, 1968
[45] Patented May 25, 1971
[73] Assignee National Research Development Corporation
 London, England
[32] Priority July 5, 1967
[33] Great Britain
[31] 31079/67

[54] MACHINES FOR PLANTING TUBERS AND THE LIKE
 7 Claims, 5 Drawing Figs.
[52] U.S. Cl.................................................. 221/224
[51] Int. Cl................................................... B65h 5/00
[50] Field of Search........................................... 111/34;
 221/173, 224, 253; 198/76, 33 (R2)

[56] References Cited
 UNITED STATES PATENTS
 1,069,362 8/1913 Wegner.................... 198/(33R2)
 1,333,006 3/1920 Welser, Jr..................... (198/33R2)

Primary Examiner—Stanley H. Tollberg
Attorney—Larson and Taylor

ABSTRACT: A machine for planting tubers, corms, bulbs or the like, such as potatoes, of the kind in which at least one coulter is adapted to draw a furrow in the soil as the machine is moved forward and means are provided for delivering a succession of the tubers from a supply carried by the machine on to driven belt means which are adapted to feed the tubers into furrow, has the belt means arranged to cause rotation of the tubers at least at some part of their travel along the belt means. The belt means may comprise a delivery trough of which one side at least comprises a continuous belt adapted to be driven at a speed related to the land speed of the machine but preferably both sides of the delivery trough comprise continuous driven belts and the belts are then arranged to be driven at substantially different speeds. The induced rotation of the tubers causes them to string out into line and substantially avoids the presentation of "doubles" to the furrow.

MACHINES FOR PLANTING TUBERS AND THE LIKE

This invention relates to machines for planting tubers, corms, bulbs or the like hereinafter referred to as potatoes. The invention relates in particular to potato planting machines of the kind having at least one coulter adapted to draw a furrow, or furrows, in the soil as the machine is moved forward and means for delivering a succession of the potatoes from a supply carried by a machine on to driven belt means which are adapted to feed the potatoes into the, or each, furrow.

According to the invention, in a planting machine of the kind specified, the belt means is arranged to cause rotation of the potatoes at least at some part of their travel towards the delivery point(s) to the, or the respective, furrow. Thus, the belt means may comprise a single continuous belt adapted to cooperate with other means such as a second continuous belt or one side of a trough, of which the first belt may form part; in the case where the belt means comprises two, or more, belts, the speed of one of the belts is arranged to be different from that of the other or others. It may be found to be advantageous to be able to have one belt moving and another stationary, or uneven to have the belts moving in opposite directions. In the single belt construction, the mere movement of the one belt is arranged to provide the necessary rotation of the potatoes by engagement thereof by both the side of the trough and the belt and in the case of the multibelt construction the difference in speeds causes the rotation.

From the point of view of high overall speed of delivery to the furrow(s), it will probably be found that in every case it is beneficial to have both belts moving in the same direction.

The speed of the or one or each of the belts may be arranged to be adjustable so as to provide means for adjusting the amount of rotation imparted to the potatoes and the speed of the, or at least one, belt is preferably arranged to bear a definite relation to the speed of travel of the machine over the ground.

In operation of a machine in accordance with the invention, the rotation caused by the belt means will tend to cause the potatoes to string out into line and to catch up with the foremost. The belt means may be such that rotation occurs only towards one end thereof but it is possible in any event to adjust the speed, or relative speeds, of the belt means so that the potatoes pass from the belt means to the furrow at regular spaced intervals. It appears that, up to a point, the longer the belt means, the less the possibility of more than one potato ('doubles') passing from the belt means at the same time.

The movement of the potatoes will, normally, from the point of view of convenience, be arranged to be in the opposite direction to that of travel of the machine but there is no reason why the belt means should not have any direction of movement relative to the general direction of movement of the machine. Moreover the belt means may be generally horizontal or it may be convenient to incline the means to the horizontal. Preferably the supply of potatoes to the belt device is from a main hopper means through secondary hopper means, the floor of the cutter being arranged to be reciprocated about one or more axes, so as to facilitate passage of the potatoes to the belt means. The belt means is of any length greater than the feed means from the secondary hopper.

The main hopper means may be compartmented to provide a feed of potatoes for different furrows or the delivery means therefrom may be arranged to supply a plurality of furrows.

The secondary hopper means preferably comprises a metering device for metering the supply of potatoes to the belt means and it may be necessary to compromise between the setting of the metering device and the feed speed, or resultant feed speed, of the belt means in order to attain a desired spacing of planted potatoes. Normally the speed of the belt means can be chosen, for instance by gear drive and/or size of driving pulleys, to meet a particular range of spacing that may be required.

Further, the coulter may be adapted to form a separate placement of fertilizer for the potatoes.

It is found, that, by use of the invention, acceptably accurate spacing can be achieved at relatively high speeds of travel. Thus, where, in known machines, it is not possible to achieve a planting speed of more than about 1 or 2 m.p.h., by use of the present invention speeds of 4 m.p.h. and more can be readily achieved. Moreover, because the feed path can be made relatively gentle in action, any shoots that may be present in the potatoes tend not to be knocked off or damaged, and advantage will be gained because the seed potatoes could give rise to advancement in terms of weeks in reaching maturity of the crop over crops grown from similar potatoes planted by known methods.

One embodiment of the invention will now be described by way of example with reference to the accompanying drawings:

FIG. 1 of the drawings shows a part plan view of a double-row potato planting machine incorporating two differential speed belt feed devices;

Figure 1:
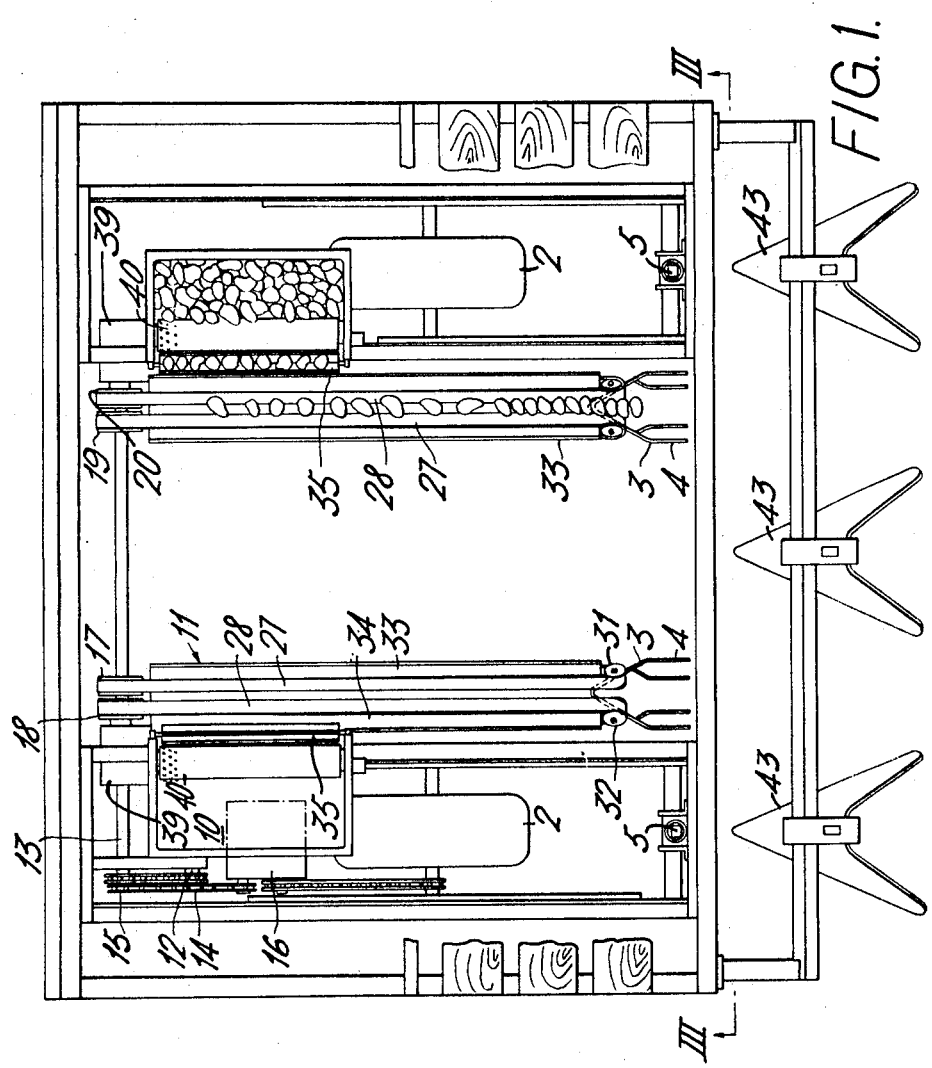
Figure 2:
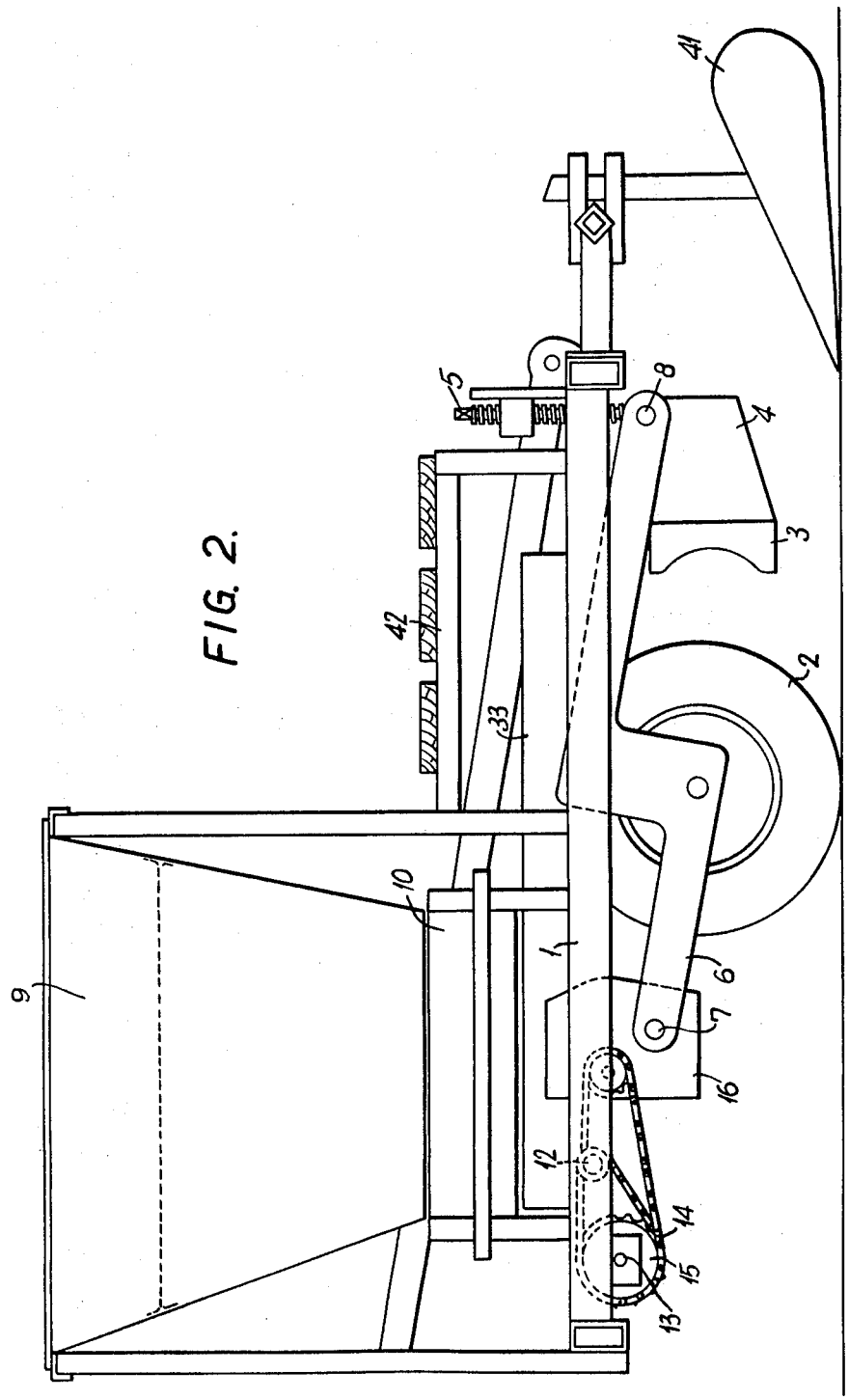
FIG. 2 is a side view of the potato planter.

The machine comprises a trailer chassis 1 adapted to be secured to the towing hitch of a vehicle, such as an agricultural tractor, so as to be towed behind the vehicle, the trailer having two land wheels 2 which support the chasses from which depend two spaced hollow coulters 3. These coulters are in a line across the fore-and-aft axis of the trailer but they could be staggered, if desired. The spacing interval will be as required and the coulters themselves are of channel section having leading edges generally V-shaped in plan view, each coulter being arranged nearly vertically with the apex of the V facing forwardly and being appropriately reinforced to divide the soil and form a furrow as the trailer is towed forwards, and the sheet-metal flanges of the leading edges extending rearwardly in the form of parallel sidewalls 4 which define a duct through which the potatoes are dropped successively into the furrow so formed.

The depth of the furrows is determined by adjustment mechanism 5 which is provided on the land wheels 2 of the machine. Thus each land wheel is mounted on rearwardly-extending legs 6 pivoted to the chassis at 7. The legs 6 are of cranked form and the rear ends are pivoted at 8 to means which is adjustable relative to the chassis by means of lead screw 5. By suitably rotating the lead screw through the medium of a hand brace attachment for the square head of the lead screw, the rear end of the chassis can be lowered or raised relatively to the ground and the position of the coulter relative to the soil is thereby determined.

The chassis carries a hopper 9 which is of bifurcated construction to feed the secondary hopper 10 associated with each of two double-belt feed devices 11.

Each secondary hopper 10 is mechanically reciprocated by means of an eccentric operated by sprocket 12 driven by chain and sprocket from the belt drive shaft 13. The shaft 13 is operated by chain and sprocket drive 14, 15 from a multispeed gear box 16 which in turn is operated directly from one of the land wheels 2, as shown in FIG. 1. The chain drive from the land wheel to the gear box is housed within the wheel mounting 6.

Figure 3:
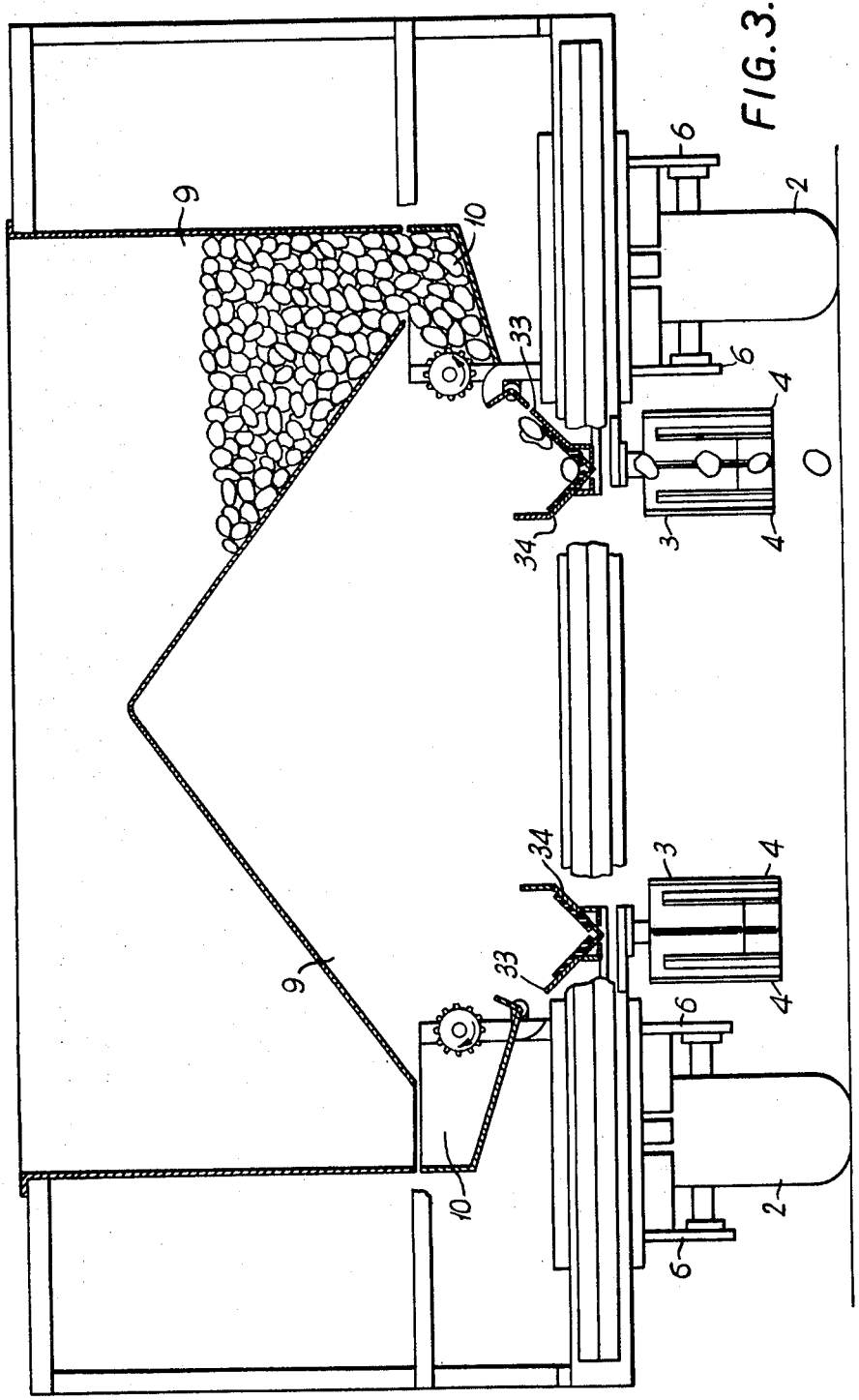
FIG. 3 is a part end view on the line III—III of FIG. 1.
Figure 4:
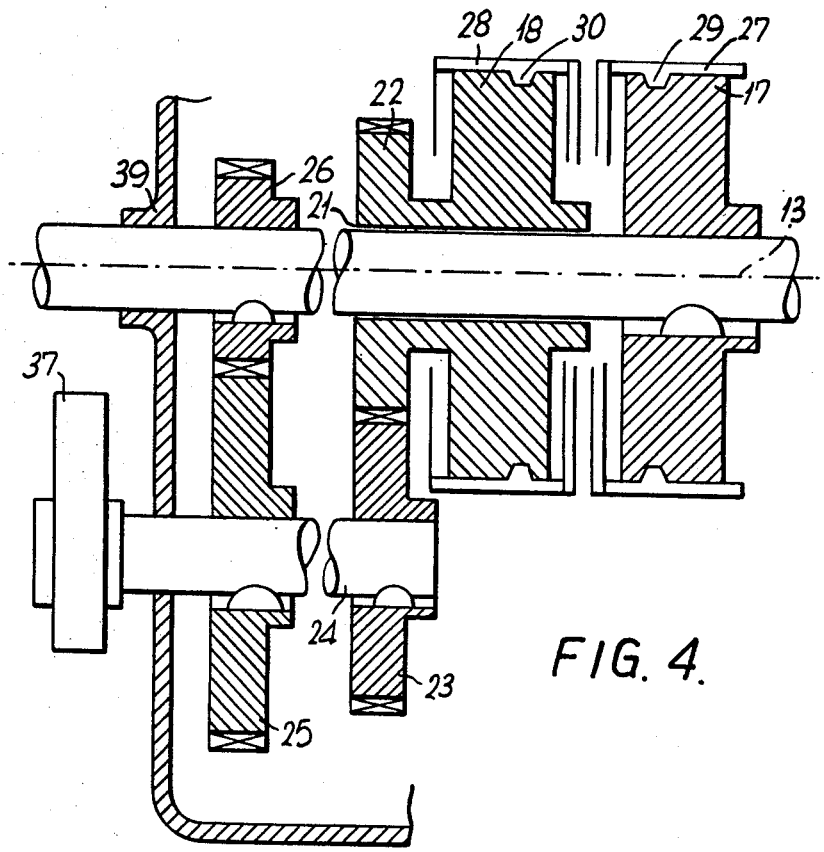
FIG. 4 is a part view of the drive to the belts of the feed device.
Figure 5:
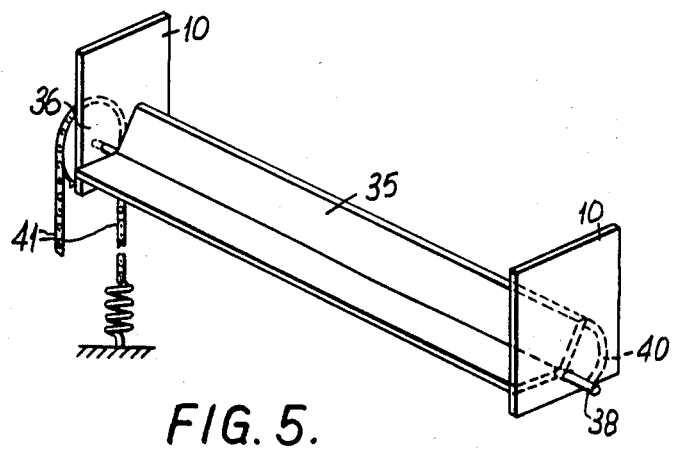
FIG. 5 illustrates the metering tipper device for transferring potatoes to the belts.

The inner pulleys 17, 19 of the two belt feeds are keyed to the shaft 13 and the outer pulleys 18,20 are mounted on bronze bushes (21, FIG. 4) to rotate relatively to shaft 13. Referring now to the pulley pair 17,18, the drive for pulley 18 is through meshing gears 22,23, slave shaft 24 and meshing gears 25,26. Gear 26 is keyed to the shaft 13 and the ratios of the gear wheels in the train to the pulley 18 are chosen to give a suitable speed differential between the belt 27 driven by pulley 17 and the belt 28 driven by pulley 18. The gear train is mounted in housing 39 on the chassis. The continuous belts 27,28 comprise broad, flat, strips of synthetic or other rubber and have V-drive portions at the back to engage the V-grooves 29,30 respectively in the pulleys 17,18 and (not shown) in idler pulleys 31,32. At the front of the machine the belts are substantially coplanar. They are supported on their upper run by formed plates 33,34 in such a way as to be brought into "V" attitude (as indicated in FIG. 3) in their travel from front to back, the transition being substantially continuous. The surface of the belts may be of any convenient form but is preferably rough enough to cause the required rotation without damage to the potatoes. The belts may be corrugated.

The following description is principally concerned with one feed unit only of the machine but it will be understood that, except for the face that the shaft 13 for both units is driven from one land wheel only, the operation of both units is substantially identical; moreover, further units may be arranged across the machine. The secondary hopper 10 has a sloping floor which may be adjustable and the reciprocating motion causes potatoes to be urged towards the outlet which is directed towards the belt-feed device. The width of this outlet is selected to be such as to accommodate a multiplicity of potatoes across the outlet and a metering device is arranged at the outlet. By making the outlet, say, ten potatoes wide, the feed rate of each potato from the hopper is substantially reduced (i.e. by a factor of 10) and the potatoes may be treated very gently. In this way chitted seed is far less damaged than in known machines in which single potatoes are required to be fed.

The metering device comprises a pivoted angled trough 35. The trough is arranged to be rotated through approximately 90° about the axis 38 to tip a row of potatoes contained therein on to the feed belts at intervals set by the speed of the land wheel of the machine. It will be arranged that the metering trough operates to ensure substantial continuity of the line of potatoes on the feed belts; that is, the trough will be operated to deliver the following batch as the last potato in the preceding batch approaches a position near the end of the trough.

Above the metering trough and with its axis parallel to that of the trough is arranged a roller 40 faced with spikes of pliable rubber or the like; the roller acts to prevent any excess of potatoes being fed to the metering trough and is also rotated slightly at each operation of the metering trough to avoid blockage that might be caused by bridging or packing together of the potatoes. The roller may be arranged on a pivoted frame and means may be provided for adjusting the frame to vary the clearance between roller and metering trough, i.e. to vary the outlet gap from the secondary hopper.

The metering trough is provided with a sprocket indicated at 36 on the axis 38 over which a chain drive 41 is passed, the chain drive being attached to a spring (not shown) anchored at one end and being engaged near the other end by a cam member 37 which is driven from the shaft 24 in the housing 29 to operate the metering trough regularly through its delivery and return cycle.

The trough is formed with a curved back surface 40 roughly concentric with the axis 38. This surface serves to close the outlet of the secondary hopper during the cycle of operation of the trough to prevent further potatoes passing to the trough until the trough is returned to its filling position.

The surface of the trough may be corrugated if desired, the corrugations corresponding roughly to the size of potatoes being sown.

In order to cover the potatoes in the furrow, soil deflectors 43 are provided to form a ridge of soil over the potatoes. By forming the rear-facing sidewalls 4 of the coulters with double walls as shown, it is possible to arrange hoppers for fertilizers with feed tubes to each of the hollow sidewalls so as to deposit fertilizers in the furrows before they are ridged by the deflectors 43.

A wood-slatted platform 42 is provided to accommodate an operator to make any necessary adjustments that are required during operation of the machines.

I claim:

1. In a potato planting machine of the type in which potatoes are fed from supply means onto at least one conveyor trough for planting, the improvement comprising a conveyor trough having sides which are relatively movable with respect to each other so as to effect rotation of the potatoes within the trough during at least some part of the travel thereof along the trough.

2. A potato planting machine as claimed in claim 1, wherein at least one side of said trough comprises a continuous belt adapted to be driven at a speed related to the land speed of the machine.

3. A potato planting machine as claimed in claim 2, wherein each side of the delivery trough comprises a continuous belt and the belts are arranged to be driven at substantially different speeds related to the land speed of the machine.

4. A potato planting machine as claimed in claim 3, wherein the belts are arranged to be driven in opposite directions.

5. A potato planting machine as claimed in claim 3 further comprising means for adjusting the speed of at least one of said belts relative to the land speed of the machine.

6. A potato planting machine as claimed in claim 1 further comprising secondary hopper means and main hopper means for feeding potatoes to said secondary hopper means, said secondary hopper means including a metering device for feeding batches of potatoes in lines of single potatoes to the belt means.

7. A potato planting machine as claimed in claim 6 further comprising means for agitating at least the floor of the secondary hopper means.